(12) United States Patent
Gilmour (10) Patent No.: US 7,066,224 B2
(45) Date of Patent: Jun. 27, 2006

(54) MOBILE SAW BENCH

(76) Inventor: Mark Andrew Gilmour, 84 Lismore Street, Abermain NSW 2326 (AU)

( * ) Notice: Subject to any disclaimer, the term of this patent is extended or adjusted under 35 U.S.C. 154(b) by 156 days.

(21) Appl. No.: 10/257,852

(22) PCT Filed: Apr. 18, 2001

(86) PCT No.: PCT/AU01/00437

§ 371 (c)(1),
(2), (4) Date: Jan. 16, 2003

(87) PCT Pub. No.: WO01/78950

PCT Pub. Date: Oct. 25, 2001

(65) Prior Publication Data

US 2004/0084110 A1  May 6, 2004

(30) Foreign Application Priority Data

Apr. 18, 2000 (AU) ............................................ PQ6972
Jul. 25, 2000 (AU) ............................................ PQ9935

(51) Int. Cl.
*B25H 1/04* (2006.01)
*B25H 1/06* (2006.01)
*B25H 1/14* (2006.01)

(52) U.S. Cl. ........................ 144/286.5; 144/287; 83/471
(58) Field of Classification Search .............. 144/286.1, 144/286.5, 285, 287, 1.1; 269/289 R, 290, 269/293; 182/181.1, 182.1, 183.1; 248/688, 248/690, 691, 371; 83/469–474, 477–477.1
See application file for complete search history.

(56) References Cited

U.S. PATENT DOCUMENTS

| | | | | |
|---|---|---|---|---|
| 4,154,435 A | * | 5/1979 | Alessio | 269/139 |
| 4,326,864 A | * | 4/1982 | Sittler | 55/364 |
| 5,247,976 A | * | 9/1993 | Matthews | 144/287 |
| 5,421,231 A | * | 6/1995 | Break et al. | 83/471.3 |
| 5,441,091 A | * | 8/1995 | Collins | 144/287 |
| 5,592,981 A | | 1/1997 | Derecktor | |
| 5,836,365 A | | 11/1998 | Derecktor | |

FOREIGN PATENT DOCUMENTS

AU         28032/1999 A    11/1999

* cited by examiner

*Primary Examiner*—Allen Ostrager
*Assistant Examiner*—Shelley Self
(74) *Attorney, Agent, or Firm*—Timothy J. Keefer; Seyfarth Shaw LLP (57) ABSTRACT

A mobile saw bench is designed for cutting elongate workpieces such as elongate open or closed steel sections. The mobile saw bench comprises a base structure which is mounted on four castor wheels. Formed continuous with the base structure is an intervening frame structure to which a benchtop is mounted. The saw is appropriately mounted to the benchtop to permit cutting of a workpiece which is located thereon. Importantly, the mobile saw bench further comprises a universal coupling. The universal coupling is mounted to an underside of the benchtop and is releasable clamped to an elongate member which is in the form of a rigid measuring staff. The universal coupling allows pivotal movement of the benchtop relative to the measuring staff which is stationary.

21 Claims, 6 Drawing Sheets

MOBILE SAW BENCH

CROSS REFERENCE TO RELATED APPLICATION

This application claims the priority of Australian patent application Ser. No. PQ 6972, filed on Apr. 18, 2000 and Australian patent application Ser. No. PQ 9935, filed Jul. 25, 2000.

FIELD OF THE INVENTION

The present invention relates generally to a mobile work bench and relates particularly, though not exclusively, to a mobile saw bench.

BACKGROUND ART

In a conventional saw bench a cut-off saw is mounted on a benchtop on which a workpiece is laid in preparation for cutting. If the workpiece is to be cut on an angle an operator can either:

reorient the workpiece on the benchtop at the required angle relative to the blade of the saw; or pivot the saw itself relative to the benchtop to reorient the saw relative to the workpiece at the required cut-off angle.

Particularly with elongate workpieces of considerable length, these techniques can be difficult to accurately and repeatedly practice without requiring a fair degree of dexterity. This can either lead to bad safety practices or cause excessive delays in the cutting of elongate workpieces.

SUMMARY OF THE INVENTION

According to one aspect of the present invention there is provided a mobile work bench including:

a base structure mounted on one or more wheels which permit movement of the bench;

a benchtop connected to the base structure; and a universal coupling mounted to the benchtop or the base structure and being adapted to couple to an elongate member, the universal coupling being designed to allow pivotal movement of the bench relative to the elongate member.

According to another aspect of the invention there is provided a mobile saw bench including:

a base structure mounted on one or more wheels which permit movement of the bench;

a benchtop connected to the base structure;

a saw mounted to the benchtop to permit cutting of a workpiece located thereon; and a universal coupling mounted to the benchtop or the base structure and being adapted to couple to an elongate member, the universal coupling being designed to allow pivotal movement of the bench relative to the elongate member to vary the angle at which the workpiece is cut.

Generally pivotal movement of the bench relative to the elongate member is about a substantially vertical axis.

Preferably the mobile saw bench also includes one or more stands spaced from the benchtop and operatively coupled to the elongate member, said stands each being adapted to provide additional support for the workpiece. More preferably each of said stands is a stationary stand including a plurality of height adjustable feet.

Typically the elongate member is in the form of a rigid staff. More typically the universal coupling and the stands are releasably clamped to the elongate member. Generally the rigid staff serves as a measuring staff.

Preferably the universal coupling includes a fixed element secured to the benchtop, and a pivotal element which is pivotally coupled to the fixed element to permit pivotal movement of the benchtop relative to the pivotal element and the elongate member to which the pivotal element is releasably coupled. More preferably the fixed element includes a fixed plate which is pivotally coupled to the pivotal element about a pivot member which passes through aligned apertures in the respective fixed plate and pivotal element. Generally the pivotal member is in the form of a bolt.

Typically the pivotal element includes a pivot plate to which one or more clamp members are connected, said clamp members being designed to releasably clamp the elongate member. More typically each of the clamp members includes a tubular member through which the elongate member is telescopically received, a locking element being coupled to the tubular member and configured to releasably engage the elongate member for clamping thereof. Generally the locking element is in the form of a grub screw or the like.

Preferably the mobile saw bench further includes an evacuation system operatively coupled to the benchtop and arranged to extract dust and/or cuttings discharged from the saw. More preferably the mobile saw bench also includes a collection device connected to the base structure and arranged relative to the evacuation system to collect the extracted dust and/or cuttings. Generally the evacuation system includes a chute having an inlet disposed adjacent the saw, and the collection device includes a tray or basket located beneath an outlet of the chute.

Typically the evacuation system relies solely on a draught created by a blade of the saw to extract dust and/or cuttings. More typically the chute inlet is arranged so that it is generally aligned with the trajectory of the draught.

Typically the collection device includes a filter element connected across the chute for filtering of the dust and/or cuttings. More typically the filter element includes a filter medium sandwiched between a pair of mesh plates. In one example the filter medium is formed from a metal, such as stainless steel, swarf.

Typically the base structure is connected to the benchtop via an intervening frame structure on which the benchtop is mounted.

BRIEF DESCRIPTION OF THE DRAWINGS

In order to achieve a better understanding of the nature of the present invention several preferred embodiments of a mobile work or saw bench will now be described, by way of example only, with reference to the accompanying drawings in which.

DETAILED DESCRIPTION OF THE INVENTION

Figure 1:
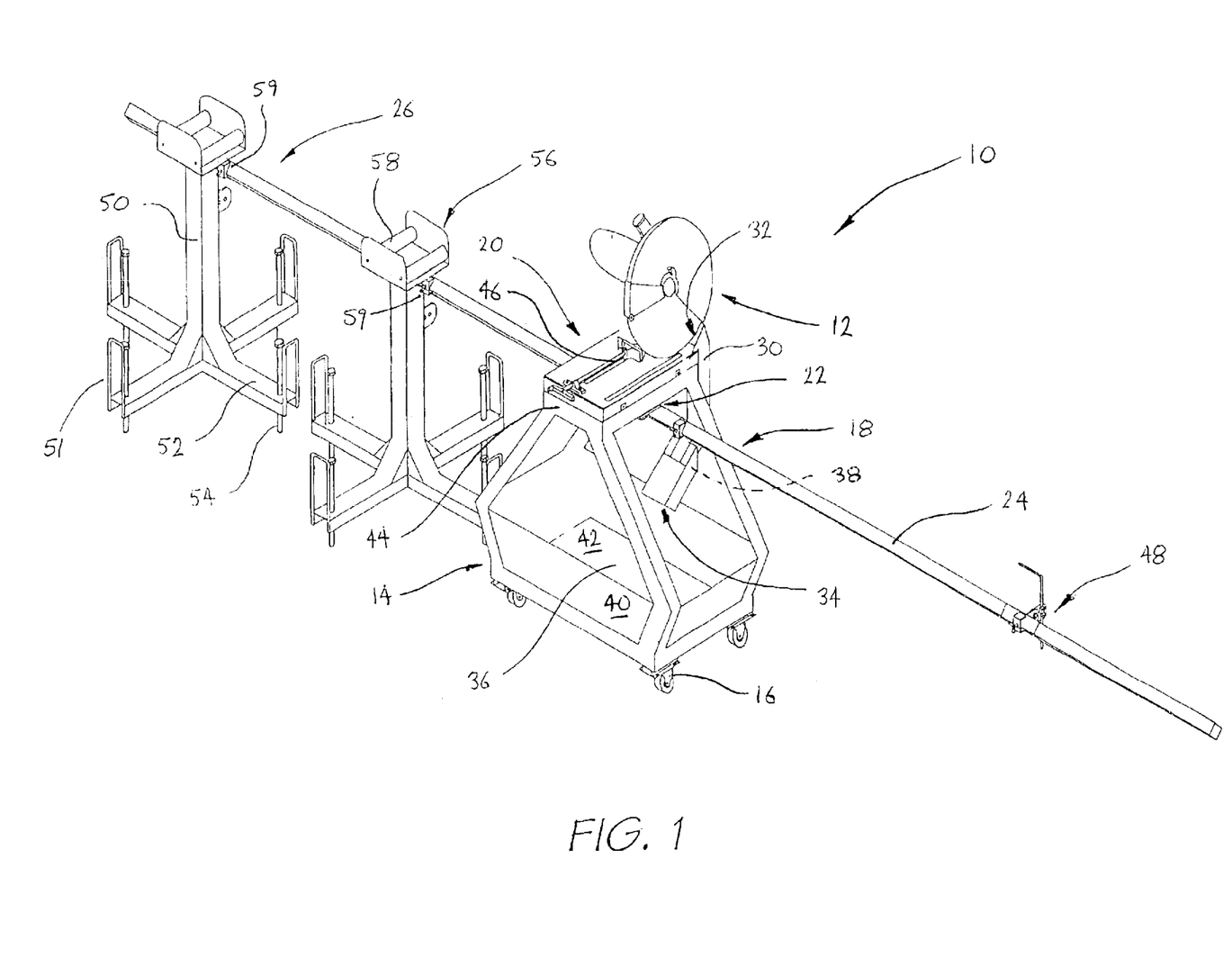
FIG. 1 is an axonometric view of a mobile saw bench including a pair of stands.

As shown in FIG. 1 there is a mobile saw bench shown generally as 10 which in this embodiment is designed for cutting elongate workpieces such as elongate open or closed steel sections. The cut-off saw 12 is a proprietary product such as a Makita model 2416s 405 mm cut-off saw, although many other brands and types of saw can be used in conjunction with the invention.

The mobile saw bench 10 comprises a base structure 14 which is mounted on four castor wheels such as 16. Formed continuous with the base structure 14 is an intervening frame structure 18 to which a benchtop 20 is mounted. The proprietary saw 12 is appropriately mounted to the benchtop 20 to permit cutting of a workpiece which is located thereon.

Figure 4:
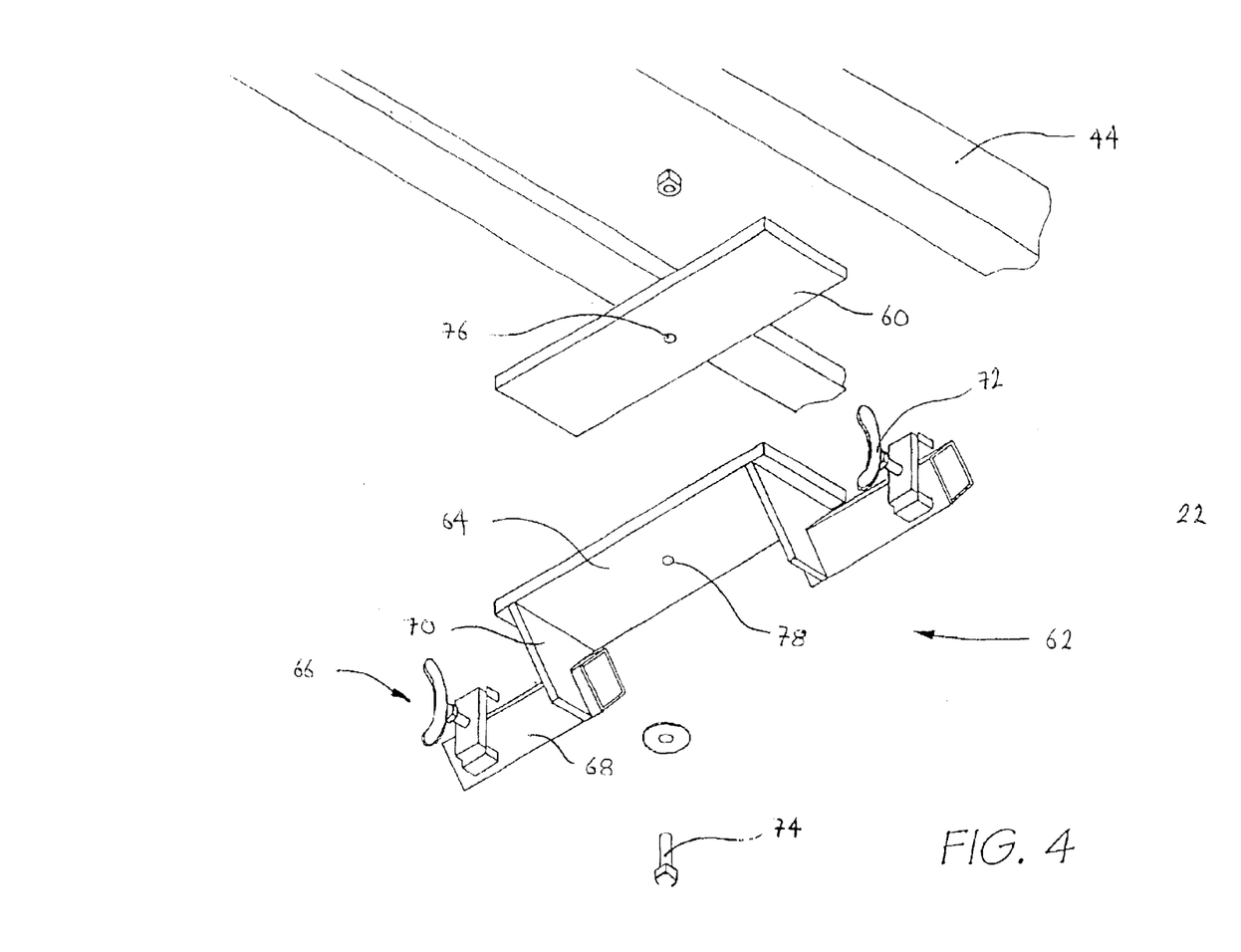
FIG. 4 is an exploded lower perspective view of part of the work bench of FIGS. 1 and 2.

Importantly, the mobile saw bench 10 further comprises a universal coupling depicted generally as 22 and shown in FIG. 4 in exploded detail. The universal coupling 22 is in this example mounted to an underside of the benchtop 20 and is releasably clamped to an elongate member 24 which in this embodiment is in the form of a rigid measuring staff. The universal coupling 22 allows pivotal movement of the benchtop 20 relative to the measuring staff 24 which is stationary.

In this example the mobile saw bench 10 additionally comprises a pair of spaced apart stands such as 26 which are adapted to provide additional support for the elongate workpiece (not shown). The stands such as 26 are each releasably clamped to the measuring staff 24 at a required spacing depending on the length of the workpiece to be cut. In operation the workpiece is laid across the stands such as 26 and the benchtop 20 in preparation for cutting. The benchtop 20 together with the base structure 14 can then be pivoted whereby the cut-off saw 12 is oriented at the required cut-off angle for the workpiece.

The mobile saw bench 10 further comprises an evacuation system which is operatively coupled to the benchtop 20 and arranged to extract dust and/or cuttings discharged from the cut-off saw 12. In this embodiment the evacuation system includes a chute 30 having inlet and outlet openings 32 and 34, respectively. The chute 30 is connected to the benchtop 20 so that the inlet opening 32 is located immediately adjacent the cut-off saw 12 so as to receive cuttings therefrom. The blade of the saw creates a draught which is directed toward and drawn through the chute 30. The trajectory and velocity of the draught is alone sufficient to "suck" dust and/or cuttings through the chute 30. The outlet 34 of the chute 30 is directed toward a tray 36 formed in the base structure 14 of the saw bench 10. Additionally, a filter element 38 is coupled to the chute 30 adjacent its outlet 34 to filter cuttings and other solid material discharged from the cut-off saw 12. The filter element 38 in this example includes a filter medium such as stainless steel swarf sandwiched between a pair of mesh plates (not shown).

Figure 2:
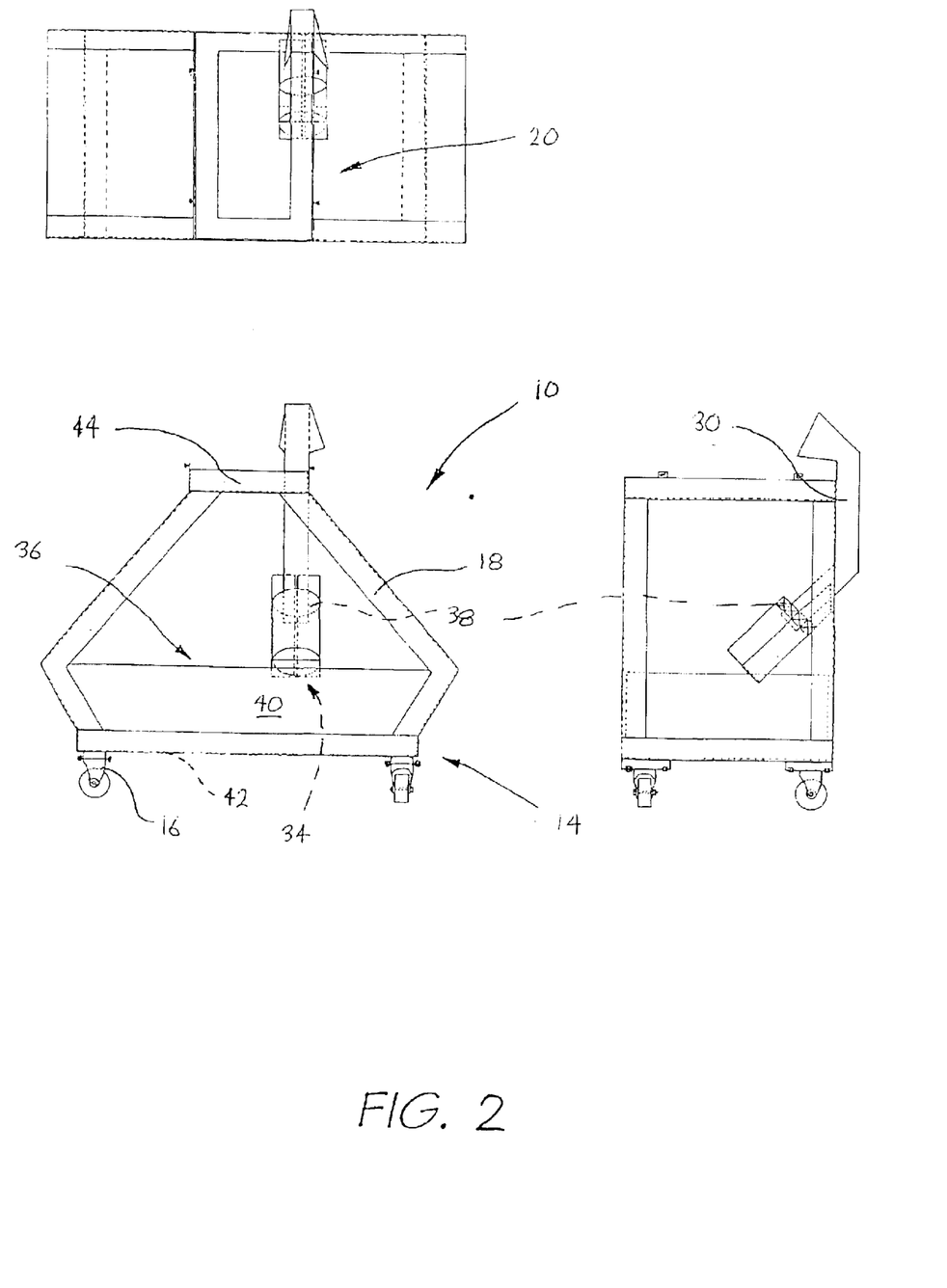
FIG. 2 is a plan together with side and end elevational views of the mobile saw bench of FIG. 1 without the cut-off saw.

As shown in FIG. 2 the saw bench 10 of this embodiment has the base 14 and intervening frame 18 structures fabricated of angle-section steel. The base structure 14 is generally rectangular whereas the intervening frame structure 18 is formed from four (4) bent legs which extend upwardly from each corner of the base structure 14. Side wall and floor panels such as 40 and 42, respectively define the tray 36 of the saw bench 10. Otherwise, a benchtop frame 44 of a rectangular configuration is connected or in this instance welded to an upper end of the legs of the frame structure 18. The benchtop frame 44 provides a platform on which the benchtop 20 is mounted together with the cut-off saw 12 and an appropriate workpiece clamp such as 46.

The chute 30 is in this embodiment welded to the benchtop frame 44 and a portion of one of the legs of the frame structure 18. The filter element is detachably fitted to a lower end of the chute 30 for removal and cleaning thereof. The chute inlet 32 is flared outwardly so as to improve the capture of cuttings. Otherwise, the filter element is depicted by the crossed hatching in FIG. 2.

The rigid measuring staff 24 is formed of a square hollow section (SHS) which is positioned in a diagonal orientation. Abutment means such as the sliding element 48 is telescopically received on the measuring staff 24 and provides a fixed point against which the workpiece can abut for cutting of the workpiece at its required length.

Figure 1A:
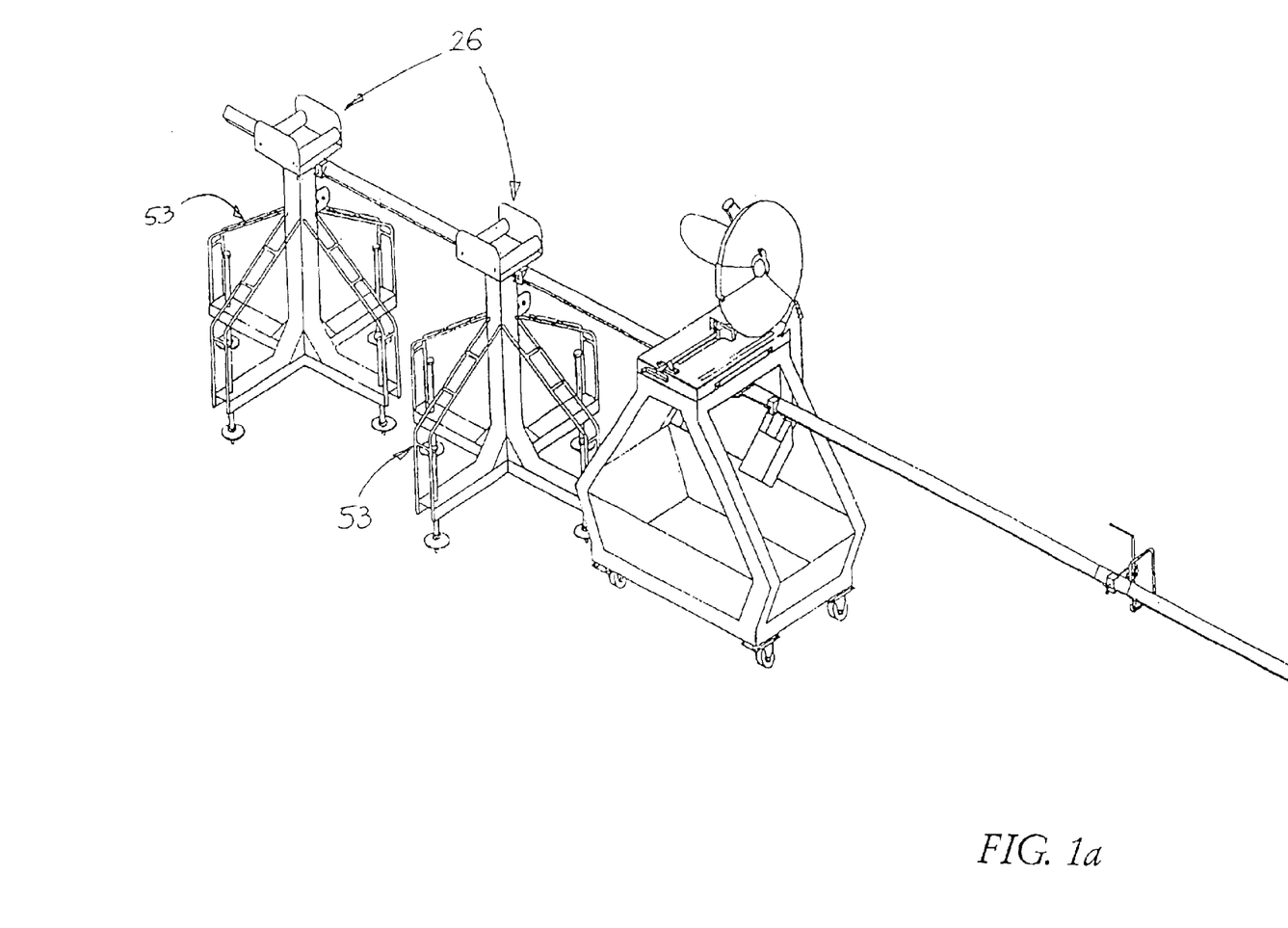
FIG. 1a is an axonometric view of a mobile saw bench including an alternative pair of stands to that shown in FIG. 1.

The stands 26 of FIG. 1 are of identical construction including a central pedestal 50 from which four (4) legs such as 52 radially extend. Each of the legs such as 52 is provided with an adjustable foot element 54 which in this embodiment takes the form of a threaded rod. Guard segments 51 protect the user of the bench from injury or collision with foot elements 54. A roller platform 56 is mounted to an upper end of the pedestal 50. The roller platform 56 includes a pair of rollers such as 58 across which the workpiece is laid in preparation for cutting. Each of the stands 26 includes a clamping element 59 having a tubular section of an SHS profile configured to slidably receive the measuring staff 24. The clamping device 59 is also provided with a clamping screw which may be in the form of a grub screw or the like which is threaded through the clamping member and engages the measuring staff 24 at a corner portion thereof. Thus, each of the stands 26 can be repositioned at various positions along the measuring staff 24 and then clamped thereto. The adjustable feet 54 ensure that the load of the workpiece is borne by the stand 26 and not the measuring staff 24. An alternative embodiment of the workbench and stands is shown in FIG. 1A. Like components of this alternative workbench have the same part numbers as those components shown in FIG. 1. In FIG. 1A the foot guard segments 53 are of a different type to that shown in FIG. 1 (and numbered 51). Segments 53 confer greater stability to the stand 26 itself while protecting the user of the bench from injury or collision with the foot element/s.

Figure 3:
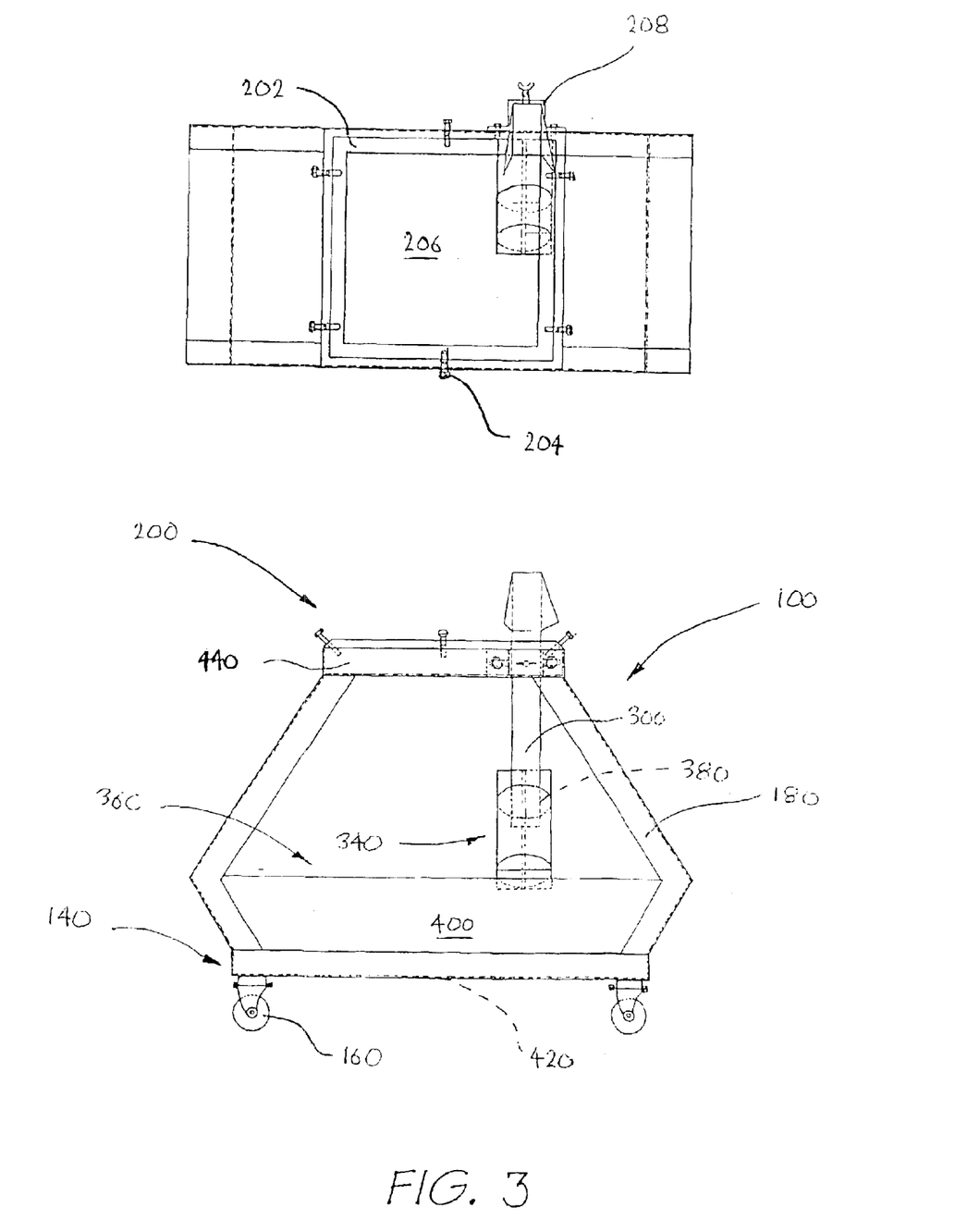
FIG. 3 is a plan and side elevational view of an alternative mobile work bench.

FIG. 3 illustrates a variation of the workbench 10 of FIGS. 1 and 2. For ease of reference and in order to avoid repetition like components of this alternative workbench have been designated with an additional "0". For example, the base structure has been designated as 140. For clarity purposes the cut-off saw and the universal coupling have not been illustrated. The workbench 200 of this particular construction is in profile substantially square-shaped. The benchtop includes a peripheral platform 202 which is affixed to the benchtop frame 440 via threaded bolts such as 204. The platform 202 includes a recess 206 being adapted to receive and locate a universal 405 mm cut-off saw. The discharge chute 300 of this embodiment is clamped rather than welded to the benchtop frame 440 via a bracket 208. Otherwise, this alternative mobile sawbench 100 is similar in construction to the preceding embodiment.

Figures 5A, 5B:
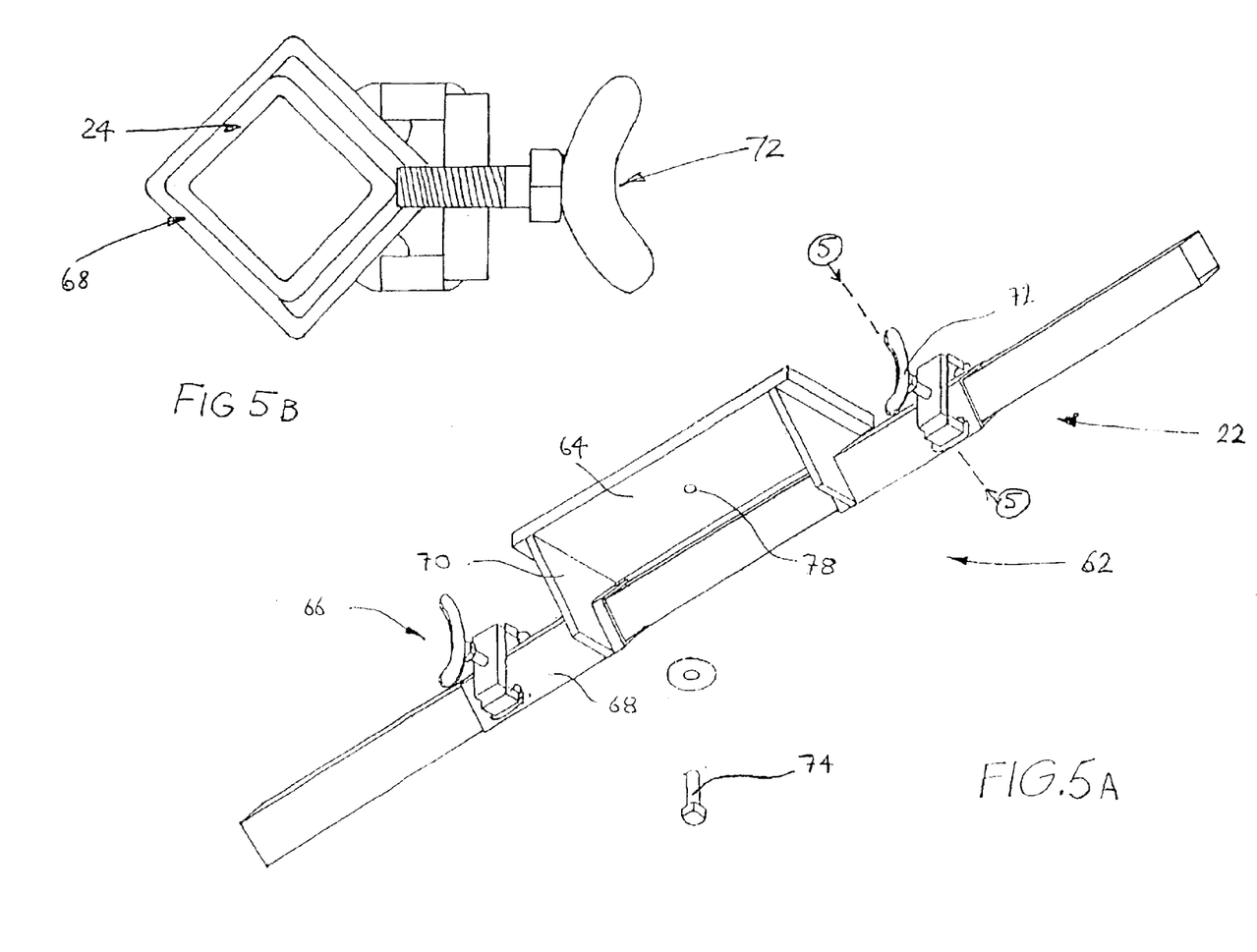
FIG. 5a is a further view of the apparatus shown in FIG. 4 when assembled.
FIG. 5*b* is a sectional view of a portion of the assembled apparatus shown in FIG. 5*a* along line 5—5.

FIG. 4 illustrates one example of the universal coupling 22 of the mobile saw bench 10 of FIGS. 1 and 2. The universal coupling includes a fixed element or plate 60 which is welded or otherwise fixed to an underside of the benchtop frame 44. The universal coupling 22 also comprises a pivotal element shown generally as 62 which includes a pivot plate 64 to which a pair of clamp members such as 66 are connected. The clamp members 66 each include a relatively short length of a SHS aligned with one another and connected to the pivot plate 64 via a connecting web such as 70. The SHS 68 is designed to slidably receive the measuring staff 24 which is thus operatively coupled to the workbench 10. This is illustrated in FIG. 5(*a*). A grub screw 72 is arranged to screw threadingly engage the SHS 68 and abut or fixedly grip the measuring staff 24 so that two outer faces of staff 24 are placed in close frictional contact with two interior faces of SHS 68 in the manner shown in FIG. 5(*b*) thereby assisting the stabilisation of the apparatus in use. In further embodiments grub screws can be inserted vertically upward from the underside of the SHS to similarly hold the measuring staff in place against two interior faces of the SHS. A pivot member in the form of a pivot bolt 74 passes through aligned apertures 76 and 78 formed in the fixed and pivotal plates 60 and 64, respectively. Thus, the pivot plate 64 together with the measuring staff 24 pivots about the fixed plate 60 and the remainder of the mobile bench 10.

In order to further facilitate an understanding of the invention operation of the mobile saw bench 10 will now be explained. The general steps involved in cutting an elongate workpiece are as follows:

(i) the workpiece is placed across the workbench 20 and adjacent stands such as 26;
(ii) an end of the workpiece is brought into abutment with the abutment means 48 which is positioned depending on the length at which the workpiece is to be cut;
(iii) the workbench 10 is pivoted relative to the measuring staff 24 and the workpiece so that the cut-off saw 12 is oriented at the required cut-off angle relative to the workpiece;
(iv) the cut-off saw 12 is brought down to cut the workpiece at the required angle and length; and
(v) this operation is repeated for this or subsequent lengths of the workpiece wherein the workbench 10 is pivoted to the require cut-off angle.

Now that several preferred embodiments of the invention have been described in some detail it will be apparent to those skilled in the art that the mobile workbench and in particular the mobile saw bench has at least the following advantages:

workpieces can be cut at a required angle with relative ease merely by rotating the workbench itself without repositioning either the workpiece or the cut-off saw;
the mobile saw bench is particularly effective in repetitive cutting of elongate workpieces;
the mobile saw bench provides effective dust and/or cuttings extraction and collection; and
the mobile saw bench is relatively safe to use with minimal trade skills and dexterity.

Those skilled in the art will appreciate that the invention described herein is susceptible to variations and modifications other than those specifically described. For example, the mobile workbench may not be limited to a saw bench but rather may extend to practically any bench arrangement to which an elongate member is pivotally coupled to allow reorientation of the bench relative to the elongate member. For example, the workbench can be utilised for varied purposes such as mounting drills, hole punches or other scoring devices, or for sanding and/or painting of workpieces where the use of a tool or other implement mounted to the workbench and angled relative to the workpiece is required. Furthermore, the mobile bench need not include the stands as described in the preferred embodiment. The universal coupling may take a variety of forms provided it allows pivotal movement of the bench itself about the elongate member. In further embodiments the universal coupling can thus be coupled to any portion of the workbench. In a production line assembly more than one mobile bench may be pivotally coupled to a common elongate member. This permits simultaneous cutting of an elongate workpiece at the required length and cut-off angles.

All such variations and modifications are to be considered within the scope of the present invention the nature of which is to be determined from the foregoing description.

For the purposes of this specification it is to be clearly understood that the word "comprising" means "including but not limited to", and that the word "comprises" has a corresponding meaning.

It is to be understood that, if any prior art publication is referred to herein, such reference does not constitute an admission that the publication forms a part of the common general knowledge in the art, in Australia or any other country.

What is claimed is:

1. A mobile work bench including:
   a base structure mounted on one or more wheels which permit movement of the bench;
   a benchtop connected to the base structure; and
   a universal coupling mounted to the benchtop or the base structure and being adapted to couple to an elongate member, the universal coupling being arranged to pivotally couple the work bench and the elongate member;
   wherein the universal coupling comprises;
   a fixed element secured to the benchtop, and
   a pivotal element which is pivotally coupled to the fixed element, the pivotal element including a pivot plate at which one or more clamp members are arranged to releasably clamp the elongate member, the or each clamp member including a tubular member through which the elongate member is telescopically received and a locking element being coupled to the tubular member and configured to releasably engage the elongate member for clamping thereof.

2. A mobile work bench as claimed in claim 1 wherein the pivotal element permits pivotal movement of the benehtop relative to the pivotal element and the elongate member to which the pivotal element is releasably coupled.

3. A mobile work bench as claimed in claim 2 wherein the fixed element includes a fixed plate which is pivotally coupled to the pivotal element about a pivot member which passes through aligned apertures in the respective fixed plate and pivotal element.

4. A mobile workbench as claimed in claim 3 wherein the pivot member is a bolt.

5. A mobile workbench as claimed in claim 1 wherein the locking element is in the form of a grub screw or the like.

6. A mobile workbench of claim 1 wherein pivotal movement of the bench relative to the elongate member is about a substantially vertical axis.

7. A mobile workbench of claim 1 also including one or more stands spaced from the benchtop and operatively coupled to the elongate member, said stands each being adapted to provide additional support for a workpiece which is supported on the benchtop in use.

8. A mobile workbench as claimed in claim 7 wherein each of said stands is a stationary stand including a plurality of height adjustable feet.

9. A mobile workbench of claim 8 wherein the universal coupling and the stands are releasably clamped to the elongate member.

10. A mobile workbench of claim 1 wherein the elongate member is in the form of a rigid staff.

11. A mobile workbench as claimed in claim 10 wherein the rigid staff serves as a measuring staff.

12. A mobile workbench of claim 1 wherein the benchtop supports a saw and further includes an evacuation system operatively coupled to the benchtop and arranged to extract dust and/or cuttings discharged from the saw.

13. A mobile workbench as claimed in claim 12 wherein the work bench also includes a collection device connected to the base structure and arranged relative to the evacuation system to collect the extracted dust and/or cuttings.

14. A mobile workbench of claim 13 wherein the evacuation system includes a chute having an inlet disposed adjacent the saw, and the collection device includes a tray or basket located beneath an outlet of the chute.

15. A mobile workbench of claim 14 wherein the chute is arranged such that a draught created by a blade of the saw extracts dust and/or cuttings for discharge into the chute.

16. A mobile workbench of claim 15 wherein the chute inlet is arranged so that it is generally aligned with the trajectory of the draught.

17. A mobile workbench of claim 16 wherein the collection device includes a filter element connected across the chute for filtering of the dust and/or cuttings.

18. A mobile workbench as claimed in claim 17 wherein the filter element includes a filter medium sandwiched between a pair of mesh plates.

19. A mobile workbench as claimed in claim 18 wherein the filter medium is formed from a metal, such as stainless steel, swarf.

20. A mobile workbench of claim 1 wherein the base structure is connected to the benchtop via an intervening frame structure on which the benchtop is mounted.

21. A mobile saw bench including:

a base structure mounted on one or more wheels which permit movement of the bench;

a benchtop connected to the base structure;

a saw mounted to the benchtop to permit cutting of a workpiece located thereon; and a universal coupling mounted to the benchtop or the base structure and being adapted to couple to an elongate member, the universal coupling being arranged to pivotally couple the work bench and the elongate member to vary the angle at which the workpiece is cut;

wherein the universal coupling comprises:

a fixed element secured to the benchtop, and a pivotal element which is pivotally coupled to the fixed element, the pivotal element including a pivot plate at which one or more clamp members are arranged to releasably clamp the elongate member, the or each clamp member including a tubular member through which the elongate member is telescopically received and a locking element being coupled to the tubular member and configured to releasably engage the elongate member for clamping thereof.

* * * * *